United States Patent Office 2,924,920
Patented Feb. 16, 1960

2,924,920

SEALING HARD-SHELL GELATIN CAPSULES

Elly T. Margolis, Los Angeles, Calif.

No Drawing. Application September 2, 1958
Serial No. 758,611

4 Claims. (Cl. 53—38)

This invention relates to gelatin capsules and, more particularly, to sealed, "hard-shell" gelatin capsules and a method for the production thereof. The invention further relates to a novel liquid composition useful in the contemplated capsule-sealing method.

Gelatin capsules may be generally classified into two broad categories including a first category of hard-shell capsules and a second category of soft-shell capsules. Hard-shell capsules are characterized by capsule walls of sufficient rigidity to be shape-retaining under normal conditions. Gelatin is almost universally used in the manufacture of hard-shell capsules and, to the end that the necessary rigidity may be maintained, essentially pure gelatin without addition agents, except small quantities of coloring ingredients, is preferably used. In the manufacture of hard-shell capsules, plasticizers are largely avoided and, generally speaking, in no event are present in amounts exceeding about 5% of the dry weight of the gelatin. Soft-shell capsules, by way of contrast, are normally formulated from gelatin compositions containing plasticizers and other ingredients in an amount substantially greater than 5% to the end that the walls thereof may be soft and capable of welding together, whereby the capsule parts are sealed during the process of manufacture. This invention is particularly concerned with a method for the production of sealed, hard-shell gelatin capsules.

It is conventional to utilize hard-shell gelatin capsules to dispense predetermined dosages of drugs. Such capsules normally comprise an open-ended, generally cylindrical body portion and a cap portion adapted to telescope over and close the open end of the body portion. Both the body portion and the cap portion are conventionally provided with externally convex closed ends.

Hard-shell gelatin capsules are conventionally filled by placing powdered drugs in the body portion thereof, and thereafter fitting the top portion over the body portion. Compacted, powdered drug materials expand sufficiently in volume to exert a pressure on the inner walls of the capsules filled therewith and hence normally provide effective frictional engagement between the capsule parts such that additional sealing is unnecessary.

Of recent years, however, it has become conventional in the drug industry to fill hard-shell capsules with non-compacted solids including granular or pelletized materials, such as the so-called "timed-disintegration" pellets, which do not expand after the capsule is closed to provide a pressure effective to produce a friction seal between the capsule parts. Separation of capsules filled with such materials is a serious problem. Not only is the economic waste of the spoiled capsules per se a significant factor, but considerable expense is also entailed in the inspection of the filled capsules which is a necessary prerequisite to filling trade packages therewith. Moreover, ill will is created in the trade by the presence of separated capsules which, despite rigid inspection, inevitably appear in at least some of the trade packages placed in commerce. It is therefore necessary, particularly in respect to hard-shell capsules filled with such uncompacted or granular drug products, positively to "seal" the filled capsules to foreclose separation of the capsule parts.

Prior to this invention, no economically feasible, practical solution to the hard-shell capsule sealing problem has been developed. In general, prior art expedients have entailed mechanical procedures, such as the application of a sealing band as disclosed in Colton United States Patent 1,861,047 or the use of an adhesive, for example, petroleum resin jelly or glue as disclosed in Yard United States Patent 2,638,179.

It is accordingly a primary object of the invention to provide a method effective to seal hard-shell gelatin capsules.

It is a more specic object of the invention to provide a method effective to seal hard-shell gelatin capsules containing uncompacted powders, granular and pelletized compositions, and other materials similarly ineffective to generate pressure within the filled capsule requisite to produce a "seal" by friction between the capsule parts.

It is an additional specific object of the invention to provide a novel sealed, hard-shell gelatin capsule product.

It is a further specific object of the invention to provide a novel liquid composition of matter useful in the production of sealed, hard-shell gelatin capsules.

In accordance with this invention, hard-shell gelatin capsules are effectively sealed by contacting said capsules with a liquid medium at a temperature of not more than about 70° C. consisting essentially of about five to about fifteen parts by weight of an aliphatic, water-soluble polyhydric alcohol containing from about three to about seven carbon atoms, from about twenty-five to about forty-five parts by weight of a water-soluble aliphatic monohydric alcohol containing from about two to about four carbon atoms and from about fifteen to about forty parts by weight of water, maintaining said capsules in contact with said liquid medium for at least about ten seconds to produce a seal between the capsule parts, thereafter removing said capsules from contact with said medium, and drying the sealed capsules.

The formulation of the liquid media utilized constitutes a critical feature of the invention. It is essential that the liquid medium be so formulated that the capsules, when placed in contact therewith, are effectively sealed without material change in appearance. Moreover, the liquid medium must be so formulated that the capsule does not become sticky or tacky in the sealing process and be characterized by a viscosity sufficiently high to foreclose penetration thereof into the interstice between the capsule parts. Accordingly, the specific materials and the relative proportions thereof utilized in the liquid medium of the invention are carefully selected to achieve a satisfactory sealed capsule product.

The liquid media embraced by the present invention essentially consist of a three component mixture of a water-soluble aliphatic polyhydric alcohol, a water-soluble aliphatic monohydric alcohol and water.

The water-soluble aliphatic polyhydric alcohols contemplated include all such straight and branched chain, saturated and unsaturated compounds having from about three to about eight carbon atoms. Specifically, contemplated compounds include glycerol; 1,3-propanediol; 2,3,4-pentanetriol; 1,2,6-hexanetriol; 1,4-hexanediol; 2,5-hexanediol, 2 methyl 2,4-pentanediol; 1,2-propanediol; 1,3-propanediol; 1,3-butanediol; 1,4-butanediol; 2,3-butanediol; 2-methyl-1,2-propanediol; 3-butene-1,2 diol; 1,2-pentanediol; 1,4-pentanediol; 1,5-pentanediol; 2-hydroxymethyl-2-methyl-1,3-propanediol; 2 - methyl-2,3-butanediol; 1,6-hexanediol; 2,3-hexanediol; 1,3,4,6-hexanetetrol;

1,2,3,4,5-hexanepentol; 1,2,3,4,5,6-hexanehexol (Sorbitol); 1,7-heptanediol and 3,4-heptanetriol. Glycerol and 1,2,6 hexanetriol are preferred.

The invention similarly is embrasive of all straight and branched chain, saturated and unsaturated aliphatic monohydric alcohols which are water-soluble and which have from about two to about four carbon atoms per molecule including specifically ethanol, propanol, butanol, isopropanol, isobutanol, propenol, and butenol.

The liquid media utilized may, of course, contain materials other than the three essential components, which do not adversely affect the use thereof. The invention is therefore appropriately defined as consisting essentially of aliphatic polyhydric alcohols, aliphatic monohydric alcohols and water to embrace such additional materials.

The relative proportions of the three essential components of the liquid media contemplated are carefully adjusted to produce satisfactory sealed capsule products. More specifically, the invention contemplates liquid media containing from about five to about fifteen, and preferably from about eight to about twelve parts by weight of aliphatic, water-soluble, polyhydric alcohol; from about twenty-five to about forty-five, and preferably from about thirty to about forty parts by weight of aliphatic, water-soluble, monohydric alcohol and from about fifteen to about forty, and preferably from about twenty to about thirty parts by weight of water.

Material variation from the specified relative proportions of the three essential ingredients of liquid media contemplated by the invention results in an unsatisfactory sealed capsule product. The specified lower limit of concentration for the aliphatic polyhydric alcohol is necessary to provide liquid media characterized by a viscosity sufficiently high to foreclose penetration of the interstice between the capsule parts and to plasticize the gelatin in the capsule parts. The upper limit of polyhydric alcohol concentration must be observed to foreclose softening and dulling the appearance of the capsules in the sealing process.

The function of the aliphatic monohydric alcohol is to prevent the capsules from becoming "tacky" when placed in contact with the liquid media contemplated by the invention. The lower concentration limit specified is requisite to satisfactory accomplishment of that objective, whereas quantities of monohydric alcohol materially in excess of the upper limit specified renders the liquid media ineffective to provide adequately sealed capsules.

The method of the invention generally contemplates contacting filled hard-shell gelatin capsules with an appropriate liquid meduim for a time period requisite to effect a seal. The most appropriate contact time will, of course, vary somewhat with variation in media formulation, temperature composition of the gelatin capsule, and the like. Those skilled in the art will be readily able to determine when a satisfactory seal has been achieved by the simple expedient of a visual examination and manual test of selected capsules. Generally a contact time of at least about ten seconds should be observed. A contact time period of from about twenty seconds to about two minutes, and preferably from about forty-five seconds to about ninety seconds, is appropriate. Contact between the filled capsule and the liquid media can be achieved in any desired manner such as spraying, dipping, or the like but is preferably effected by immersion. The liquid media is normally employed at room temperature and, in any event, is maintained at a temperature not in excess of 70° C. A temperature of from about 15° C. to about 50° C. is preferred.

Examination of hard-shell gelatin capsules sealed in accordance with the invention indicates that the sealing is effected essentially by a swelling of the capsule parts giving rise to friction requisite to foreclose inadvertent separation. It is not apparent that the seal is materially effected by "fusion" resulting from a solution of the gelatin capsule in the liquid media utilized. The foregoing hypothesis is offered, however, without limitation of the invention to any specific sealing theory.

While in this specification reference is made to hard-shell gelatin capsules, it will be appreciated that the invention applies to gelatin containing hard-shell capsules generally, including all of the various types and styles of such capsules available commercially, which comprise in the composition thereof materials other than gelatin.

*Example I*

Five thousand hard-shell gelatin capsules filled with a pelletized drug product of the "timed disintegration" type, and consisting of a mixture of pellets coated to disintegrate in a time gradient over 10–12 hours, and containing, per capsule, 5 milligrams of methscopolamine nitrate and 45 milligrams of phenobarbital are sealed in accordance with the invention by immersion for forty-five seconds in a liquid medium, maintained at room temperature of about 22° C., and consisting of 400 parts by weight of glycerol, 1480 parts by weight of isopropanol and 955 parts by weight of water. The capsules are thereafter removed from the liquid medium, drained and dried in cold air. The treated capsules are all effectively sealed, and remain effectively sealed during packaging and shipping, and until used by the ultimate consumer.

*Example II*

Example 1 is repeated with comparable results, with the exception that 1, 2, 6-hexanetriol is substituted for glycerol in the formulation of the liquid medium employed.

*Example III*

Example 1 is repeated with comparable results, with the exception that 1, 3-propanediol is employed in lieu of glycerol in the liquid medium utilized.

The invention constitutes a solution to a problem of importance in the drug industry by providing an effective economical, commercially feasible method for the production of sealed gelatin capsules and hence represents a significant contribution to the art.

I claim:

1. A process for sealing hard-shell gelatin capsules, said capsules being formed from body and cap parts, each of said parts having one closed end and one open end, the open end of said cap parts being telescoped over the open end of said body parts, said process comprising contacting said capsules with a liquid medium at a temperature of not more than about 70° C., consisting essentially of about five to about fifteen parts by weight of an aliphatic, water-soluble polyhydric alcohol containing from three to seven carbon atoms, from about twenty-five to about forty-five parts by weight of a water-soluble aliphatic monohydric alcohol containing from two to four carbon atoms and from about fifteen to about forty parts by weight of water, maintaining said capsules in contact with said liquid medium for at least about ten seconds to produce at least a friction seal between the mutual contacting areas of the capsule parts, thereafter removing said capsules from contact with said medium, and drying the sealed capsules.

2. A process according to claim 1 wherein said liquid medium consists of glycerol as the polyhydric alcohol, isopropanol as the monohydric alcohol and water.

3. A process according to claim 2 wherein said capsules are contacted with said medium by immersion therein for a period of from about forty-five seconds to about ninety seconds.

4. A process according to claim 2 wherein said medium is maintained at a temperature of from about 15° C. to about 50° C.

(References on following page)

References Cited in the file of this patent

UNITED STATES PATENTS

| | | | |
|---|---|---|---|
| 582,021 | Morstadt | May 4, | 1897 |
| 597,806 | Marangolo | Jan. 25, | 1898 |
| 628,681 | Valentine | July 11, | 1899 |
| 1,213,368 | Hibbert | Jan. 23, | 1917 |
| 1,690,760 | Volwiler | Nov. 6, | 1928 |
| 1,882,108 | Andreas | Oct. 11, | 1932 |
| 1,996,125 | Shillenn | Apr. 2, | 1935 |
| 2,275,154 | Merrill et al. | Mar. 3, | 1942 |
| 2,294,711 | Bjorksten | Sept. 1, | 1942 |
| 2,314,527 | Taylor | Mar. 23, | 1943 |
| 2,349,430 | Hiatt et al. | May 23, | 1944 |
| 2,727,833 | Yen et al. | Dec. 20, | 1955 |